(12) United States Patent
Pernleitner et al.

(10) Patent No.: US 12,152,504 B2
(45) Date of Patent: Nov. 26, 2024

(54) ROTOR FOR A TURBOMACHINE AND TURBOMACHINE

(71) Applicant: MTU Aero Engines AG, Munich (DE)

(72) Inventors: Martin Pernleitner, Munich (DE); Dieter Freno, Munich (DE); Manfred Dopfer, Munich (DE); Tino Hummel, Munich (DE); Klaus Wittig, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/784,216

(22) PCT Filed: Dec. 7, 2020

(86) PCT No.: PCT/DE2020/000313
§ 371 (c)(1),
(2) Date: Dec. 23, 2022

(87) PCT Pub. No.: WO2021/115510
PCT Pub. Date: Jun. 17, 2021

(65) Prior Publication Data
US 2023/0128349 A1   Apr. 27, 2023

(30) Foreign Application Priority Data
Dec. 12, 2019   (DE) .................. 10 2019 219 403.6

(51) Int. Cl.
*F01D 5/30*  (2006.01)
*F01D 11/00*  (2006.01)

(52) U.S. Cl.
CPC .......... *F01D 5/3007* (2013.01); *F01D 11/006* (2013.01); *F05D 2250/313* (2013.01); *F05D 2260/36* (2013.01); *F05D 2260/941* (2013.01)

(58) Field of Classification Search
CPC .......... F01D 5/3007; F01D 5/32; F01D 5/323; F01D 5/326; F01D 5/3015; F01D 11/006;
(Continued)

(56) References Cited

U.S. PATENT DOCUMENTS 5,110,262 A * 5/1992 Evans .................. F01D 5/3007
416/219 R
8,622,701 B1   1/2014 Liang
(Continued)

FOREIGN PATENT DOCUMENTS

DE   69025456 T2   8/1996
EP   2546465 A1   1/2013
(Continued)

OTHER PUBLICATIONS

English machine translation of JP-04259601A, May 4, 2023.*
English machine translation of JP-2016-223310A, May 4, 2023.*
English machine translation of JP-2002-106302A, May 4, 2023.*

*Primary Examiner* — Christopher Verdier
(74) *Attorney, Agent, or Firm* — Hinckley, Allen & Snyder, LLP; David R. Josephs

(57) ABSTRACT

A rotor for a turbomachine has at least one blade and has at least one rotor main part, which has at least one recess, in which a blade root of the least one blade is interlockingly received, wherein the blade root comprises at least one depression, in which at least one protrusion of the at least one rotor main part, which protrusion delimits the at least one recess in regions is received, wherein the at least one depression is delimited by a first delimiting face on the blade root side and the at least one protrusion is delimited by a second delimiting face on the rotor main part side. At least the first delimiting face has at least one elevation which narrows a gap at least in regions, which extends between the first delimiting face and the second delimiting face.

11 Claims, 2 Drawing Sheets

(58) Field of Classification Search
CPC ........... F05D 2260/36; F05D 2260/941; F04D 29/322; F04D 29/34
See application file for complete search history.

(56) References Cited

U.S. PATENT DOCUMENTS

| | | | |
|---|---|---|---|
| 2014/0140852 A1* | 5/2014 | Bluck | F01D 5/3007 |
| | | | 416/219 R |
| 2016/0084260 A1 | 3/2016 | Clarke | |
| 2016/0146016 A1 | 5/2016 | Johns et al. | |
| 2019/0120061 A1* | 4/2019 | Horn | F01D 5/141 |

FOREIGN PATENT DOCUMENTS

| | | |
|---|---|---|
| EP | 3246515 A1 | 11/2017 |
| JP | H 04259601 A | 9/1992 |
| JP | 2002106302 A | 4/2002 |
| JP | 2016 223 310 A | 12/2016 |
| WO | 2013 007 587 A1 | 1/2013 |

* cited by examiner

ROTOR FOR A TURBOMACHINE AND TURBOMACHINE

BACKGROUND OF THE INVENTION

The invention relates to a rotor for a turbomachine in accordance with the present invention. A further aspect of the invention relates to a turbomachine with at least one such rotor.

For rotors known from the prior art for turbomachines, respective blades of the rotor are often joined in an interlocking manner with a rotor main part, which may also be referred to as a disk. To this end, an interlocking connection between a respective blade root of the respective blades and the rotor main part occurs by inserting the blade root into a recess of the rotor main part that is provided for receiving the blade root, thereby creating an interlocking fit. The blade roots can have a fir-tree-like profile, for example, and can be held interlockingly in the recess of the rotor main body, which likewise has a fir-tree form. Via a gap, which, in the interlocking connection, can extend between the blade root and the rotor main part, it is possible, as needed, to deliver a cooling medium, such as, for example, cooling air, in order to prevent any inadmissible thermal load in the region of the interlocking connection between the blade root and the rotor main part when the rotor is used in the turbomachine as intended. For the case that, for example, a flow of cooling medium through the gap is not needed or, for example, the cooling medium becomes too hot owing to heating at the connection, which may also be referred to as the blade-disk connection, it is appropriate to seal the gap if possible, that is, to minimize a gap width extending between the blade root and the rotor main part. In order to prevent stresses from rising to an inadmissible value in a notch base of the blade root when the rotor is used as intended, the blade root is often provided with especially large radii so as thereby to reduce a notch factor. However, this can, in turn, lead to an enlargement of the gap, an increase in the gap width, and, accordingly, an increase in a leakage via the gap.

Known from US 2016/0146016 A1 are, for example, a system and a method for cooling a radially outer surface of a rotor disk support of a turbine wheel and a rotor space between a turbine blade and the rotor disk support. The turbine blade comprises at least one passage for cooling medium, which extends between an inner cooling channel and an outer surface of a shaft section of the turbine blade that directly faces a radially top face of the rotor disk support, wherein the cooling medium passage is used to deliver a flow of coolant in the direction of the radially top face of the rotor disk support.

SUMMARY OF THE INVENTION

The object of the present invention is to create a rotor as well as a turbomachine of the kind mentioned in the introduction, in which stresses in the notch base of a blade root as well as a leakage via a gap between blade root and rotor main part can be reduced.

This object is achieved in accordance with the invention by a rotor as well as by a turbomachine. Advantageous embodiments with appropriate further developments of the invention are discussed in detail below.

A first aspect of the invention relates to a rotor for a turbomachine, having at least one blade and having at least one rotor main part, which has at least one recess, in which a blade root of the at least one blade is interlockingly received, wherein the blade root comprises at least one depression, in which at least one protrusion of the at least one rotor main part that delimits the at least one recess in regions thereof is received, wherein the at least one depression is delimited by a first delimiting face on the blade-root-side and the at least one protrusion is delimited by a second delimiting face on the rotor-main-part side. The protrusion may also be referred to as a cam, in particular a disk cam. The rotor main part may also be referred to as a disk. The depression can adjoin an elevation of the blade root. The depression and the elevation can form, for example, respective regions of a fir-tree denticulation of the blade root. The first delimiting face can delimit exclusively the at least one depression. The second delimiting face can delimit exclusively the at least one protrusion.

In accordance with the invention, it is provided that at least the first delimiting face has at least one elevation, which narrows a gap between the first delimiting face and the second delimiting face at least in regions thereof. This is advantageous, because, on the one hand, this makes it possible, for example, to furnish a face portion of the first delimiting face that is arranged next to the elevation with an especially large radius, as a result of which, when the rotor is used as intended, any stresses in the blade root, in particular in a notch base of the blade root, can be reduced, and, on the other hand, this makes it possible, by way of the elevation, to narrow the gap and thereby to reduce any leakage of cooling air delivered through the gap, for example. The first delimiting face may also be referred to as the first free face or as the blade-root-side free face. The second delimiting face may also be referred to as the second free face or as the rotor-main-part-side free face.

The elevation can preferably be formed as a discontinuity. The discontinuity can then be designed, for example, as a sharp bend. In other words, the at least one discontinuity can therefore be sharp bend-shaped in form. In rotor parts known from the prior art, attention is paid to a continuous transition, that is, to a continuity between different face portions of a blade root region, that is, to the avoidance of discontinuities. In these known rotor parts, the continuity is ensured, for example, by providing small radii of curvature of the faces, as a result of which increased stresses can arise in the notch base. In contrast, the invention is based on the realization that, by way of the at least one elevation, which is formed as a discontinuity, there is an increased flexibility in the design of the first delimiting face, for example, so that the face portion arranged next to the elevation can be provided with an especially large radius in order to thereby diminish any notch effect and thus stresses in the notch base of the blade root when the rotor is used as intended. At the same time, the at least one elevation serves to narrow the gap between the blade root and the rotor main part and any leakage can thereby be reduced.

The at least one elevation of the first delimiting face may also be referred to as a blade-root-side elevation.

In principle, it is also conceivable that, additionally or alternatively, the second delimiting face has at least one elevation. This elevation may also be referred to as a rotor-main-part-side elevation. Preferably, the blade-root-side elevation and/or the rotor-main-part-side elevation are or is formed as a respective discontinuity. The respective discontinuity can preferably be formed as an edge, which can extend in the longitudinal direction of extension of the rotor and thus of the blade root and of the rotor main part. By way of the design as an edge, it is possible for a uniform and effective reduction in leakage to occur over an especially large region in the longitudinal direction of extension. By way of the uniform reduction in the leakage, it is possible to prevent in the blade root, for example, at least to a large part, any temperature-caused differences in stress in the longitudinal direction of extension.

Preferably, it can be provided that the first delimiting face rests against the second delimiting face at the at least one elevation in a sealing manner. In other words, the blade root can be supported against the main rotor part at the at least one elevation in a sealing manner. In this way, the leakage can be minimized in an advantageous way.

In an advantageous further development of the invention, the at least one elevation directly borders a first flat face portion of the first delimiting face. This is advantageous, because the at least one elevation can thereby be designed in an especially targeted manner. Thus, the at least one elevation can be shaped during the production of the blade root by producing the first flat face portion by machining. The at least one elevation can therefore be produced with little effort by creating the first flat face portion.

In an embodiment, the elevation is formed within a non-bearing flank of the blade root and, in particular, the elevation can be directed towards a flank of the protrusion of the rotor main part that is directed radially outward.

In another advantageous further development of the invention, the at least one elevation is arranged between the first flat face portion and a second flat face portion of the first delimiting face. This is advantageous, because, in this way, an especially exact positioning of the at least one elevation can be produced on the basis of the two flat face portions, that is, on the basis of the first flat face portion and the second flat face portion. The two flat face portions can be produced by machining, that is, by removal of material, namely, a material from which the blade root is formed, and the at least one elevation can thereby be formed with little effort in consequence of the production of the face portions. The at least one elevation can be arranged, in particular, directly between the first flat face portion and the second flat face portion and thereby be designed in an especially defined manner. The at least one elevation can thus border directly, on the one hand, the first flat face portion and, on the other hand, the second flat face portion. In this way, it is possible for the at least one elevation to connect the first flat face portion and the second flat face portion.

In another advantageous further development of the invention, the at least one elevation is arranged between a rounded face portion of the first delimiting face and the first flat face portion. This is advantageous, because the rounded face portion can contribute to a reduction in the notch stresses in the blade root. The at least one elevation can preferably be arranged directly between the rounded face portion and the first flat face portion and thereby connect the rounded face portion and the first flat face portion to each other. The rounded face portion can have a shorter distance from a median plane of the blade root than the first flat face portion, as a result of which the reduction in the notch stresses can occur in an advantageous way in the region of the median plane. The rounded face portion can be formed as a trough, in particular as a rounded groove. The rounded face portion can extend in the longitudinal direction of extension of the rotor along the blade root. The longitudinal direction of extension may also be referred to as an axial direction. The longitudinal direction of extension (axial direction) extends preferably parallel to a rotational axis of the rotor main part when the latter is used as intended. The rotor can be designed, for example, as a turbine wheel and, when it is used as intended, rotate around the rotational axis as well as in a housing of the turbomachine.

In another advantageous further development of the invention, the second flat face portion forms an angle with a third flat face portion that is assigned to the second delimiting face, wherein the third flat face portion, together with the first flat face portion, delimits a gap section of the gap. This is advantageous, because, owing to the angle, it is possible to avoid inadmissibly high notch stresses and the angle makes possible a greater number of degrees of freedom in the design of the blade root as well as of the rotor main part. The first flat face portion and the third flat face portion can be arranged one on top of the other in the vertical direction of extension of the rotor and thus also of the rotor main part, of the blade, and of the blade root. The vertical direction of extension may also be referred to as a radial direction of extension. The first flat face portion and the third flat face portion can overlap in the vertical direction of extension, in particular fully overlap. Beyond this, the first flat face portion and the third flat face portion can be oriented parallel to each other.

In another advantageous further development of the invention, the second flat face portion is oriented perpendicularly to a median plane of the blade root that extends parallel to a vertical direction of extension of the blade root. This is advantageous, because, in this way, a simple alignment and defined positioning of the at least one elevation can be produced via the second flat face portion. A blade reference axis of the blade as well as of the blade root can extend along the vertical direction of extension.

In another advantageous further development of the invention, the at least one elevation has an edge rounding. This is advantageous, because, in this way, it is possible to avoid any wear-promoting edge load at a tip of the at least one elevation.

In an embodiment, during operation of the rotor, the gap within the depression comprises a first gap section and a second gap section, which border each other at the elevation. The first gap section thereby extends, preferably starting from the elevation, with a gap width around an apex of the protrusion, wherein the gap width increases, initially monotonically, in particular strictly monotonically, up to a locally maximum gap width and then monotonically, in particular strictly monotonically, in particular down to zero. It is thereby possible to reduce effectively a notch stress, while, at the same time, maintaining a low leakage through the gap.

Additionally or alternatively, the second gap section can extend, starting from the elevation, at least in a region adjoining the elevation, with constant gap width, in particular linearly.

Preferably, the locally maximum gap width is arranged between the apex and the elevation.

In an advantageous embodiment, the at least one depression is a radially outermost depression of a blade root with a fir-tree-like profile. Accordingly, the elevation can be arranged opposite a cover section of a disk cam that extends, in particular, linearly.

In some embodiments, additionally or alternatively, at least one of the at least one depression is a radially second-outermost depression of a blade root with a fir-tree profile. The further radially outward the depression with the elevation is arranged, the larger is the blade root cross section at the local constriction in the region of the depression and the smaller is any impairment due to a reduction of the cross section of the constriction owing to the present invention.

A second aspect of the invention relates to a turbomachine with at least one rotor in accordance with the first aspect of the invention. The turbomachine can be designed, for example, as a jet engine. The features as well as the advantages thereof presented in connection with the rotor according to the invention in accordance with the first aspect of the invention apply for the turbomachine according to the invention in accordance with the second aspect of the invention and vice versa.

BRIEF DESCRIPTION OF THE DRAWING FIGURES

Further features of the invention ensue from the claims and the exemplary embodiments. The features and combinations of features mentioned above in the description as well as the features and combinations of features and/or solely shown features and combinations of features mentioned below in the exemplary embodiments can be used not only in the respectively presented combination, but also in other combinations or alone without leaving the scope of the invention. Accordingly, the invention is also to be regarded as comprising and disclosing embodiments that are not explicitly shown and explained in the exemplary embodiments, but which ensue and can be produced from the explained embodiments by separate combinations of features. Accordingly, embodiments and combinations of features that do not have all features of an independent claim as originally formulated are also to be regarded as disclosed. Herein:

DESCRIPTION OF THE INVENTION

Figure 1:
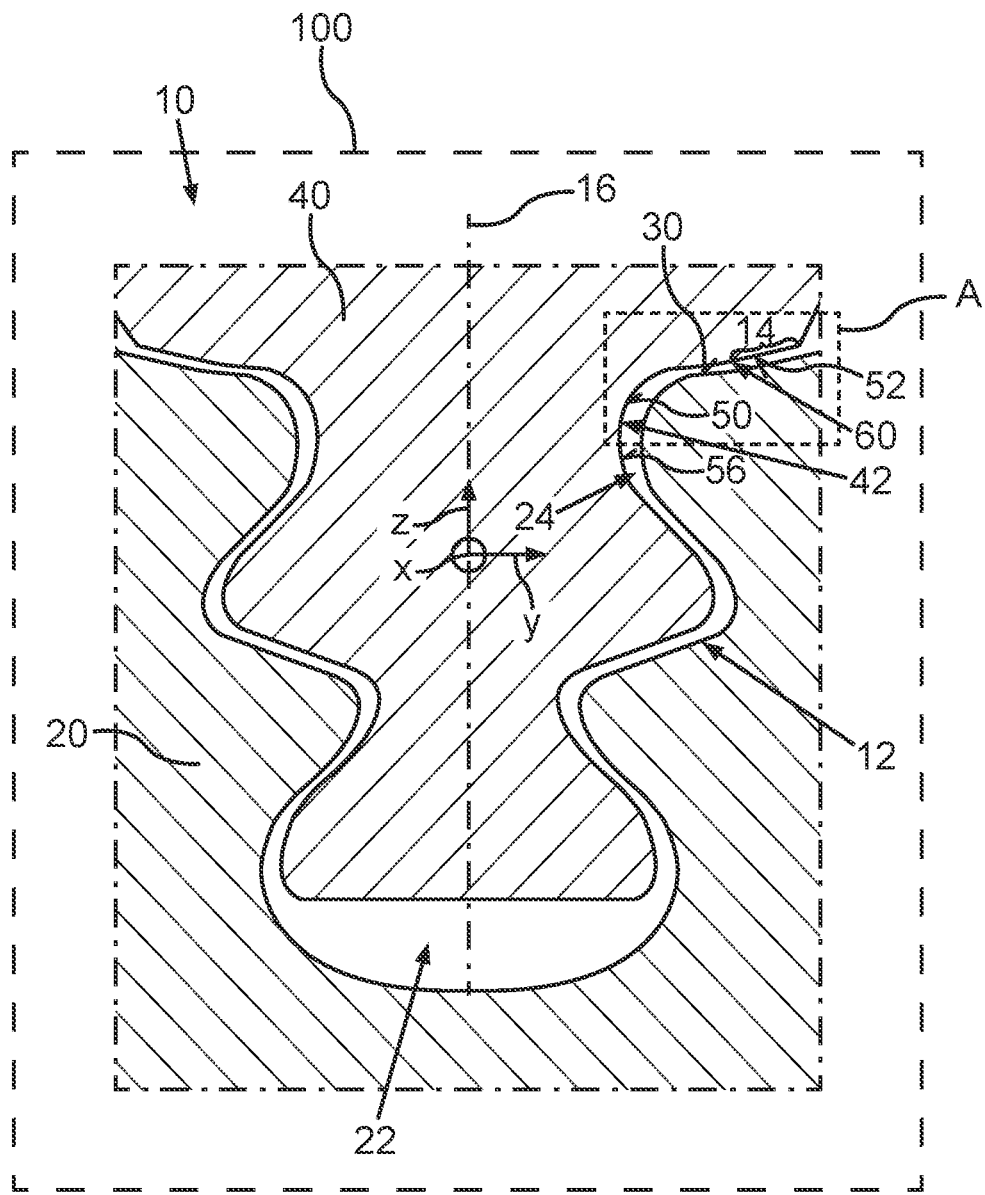
FIG. 1 shows a schematic sectional illustration of a subregion of a rotor, which has a rotor main part having a recess, in which a blade root of a blade is interlockingly received.

FIG. 1 shows, in a schematic sectional illustration, a subregion of a turbomachine 100 with a rotor 10, likewise shown schematically and in a sectional manner.

The rotor 10 comprises a plurality of blades, wherein, in the present instance, for reasons of clarity, solely one blade root 40 of one of the blades can be seen.

In addition, the rotor 10 comprises a rotor main part 20, which also may be referred to as a disk. The rotor main part 20 has a plurality of recesses for receiving respective blade roots of the respective blades. In the present instance, for reasons of clarity, solely one recess 22 is shown, in which the blade root 40 is interlockingly received.

Presented in FIG. 1—as also in the further figures—is a coordinate system that is drawn in relation to the rotor 10 and is defined by a longitudinal direction of extension x, by a peripheral or transverse direction of extension y and, by a radial or vertical direction of extension z of the rotor 10. The longitudinal direction of extension x may also be referred to as an axial direction and extends parallel to a rotational axis of the rotor 10, which is not shown here, and thus also of the rotor main part 20.

The blade root 40 comprises a depression 42, in which a protrusion 24 of the rotor main part 20 that delimits the recess 22 in regions thereof is received. The depression 42 can thereby be part of a fir-tree denticulation of the blade root 40 that can be seen in FIG. 1. The protrusion 24 of the rotor main part 20 is thereby part of a contour of the rotor main part 20 that delimits the recess 22, wherein, in the present instance, the contour is formed analogously to the fir-tree denticulation, as can also be seen in FIG. 1.

The depression 42 is delimited by a blade-root-side, first delimiting face 50. In contrast, the protrusion 24 is delimited by a rotor-main-part-side, second delimiting face 30. In the present instance, the delimiting faces 30, 50 extend in the longitudinal direction of extension x, for which reason the delimiting faces 30, 50 in the figures are depicted solely as respective lines and/or as line segments.

Figure 2:
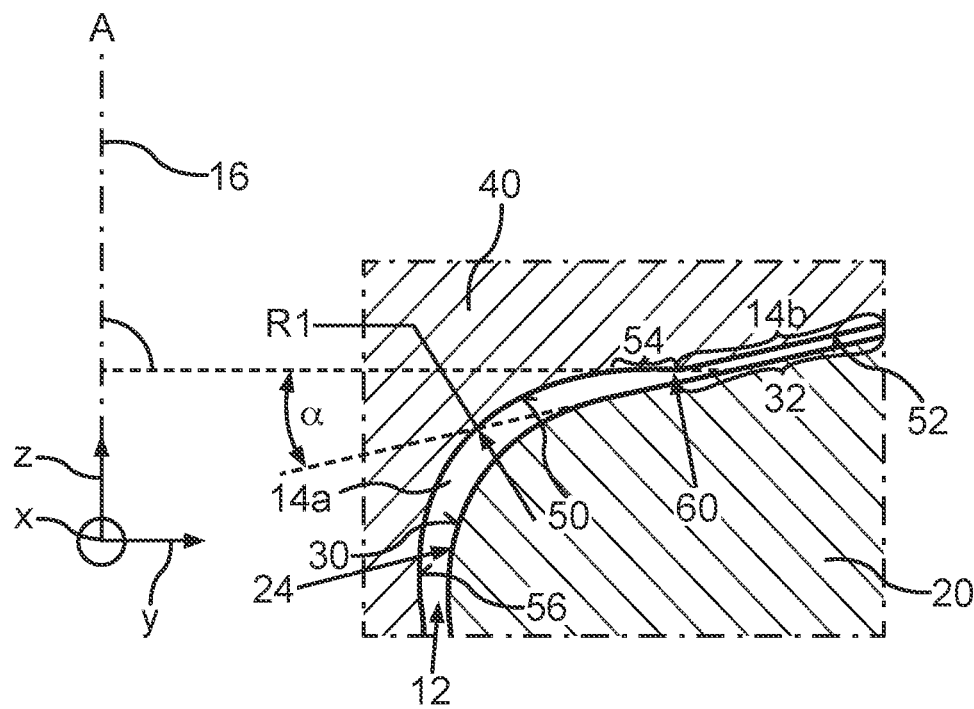
FIG. 2 shows an enlarged detailed view of a region A framed in FIG. 1.
Figure 3:
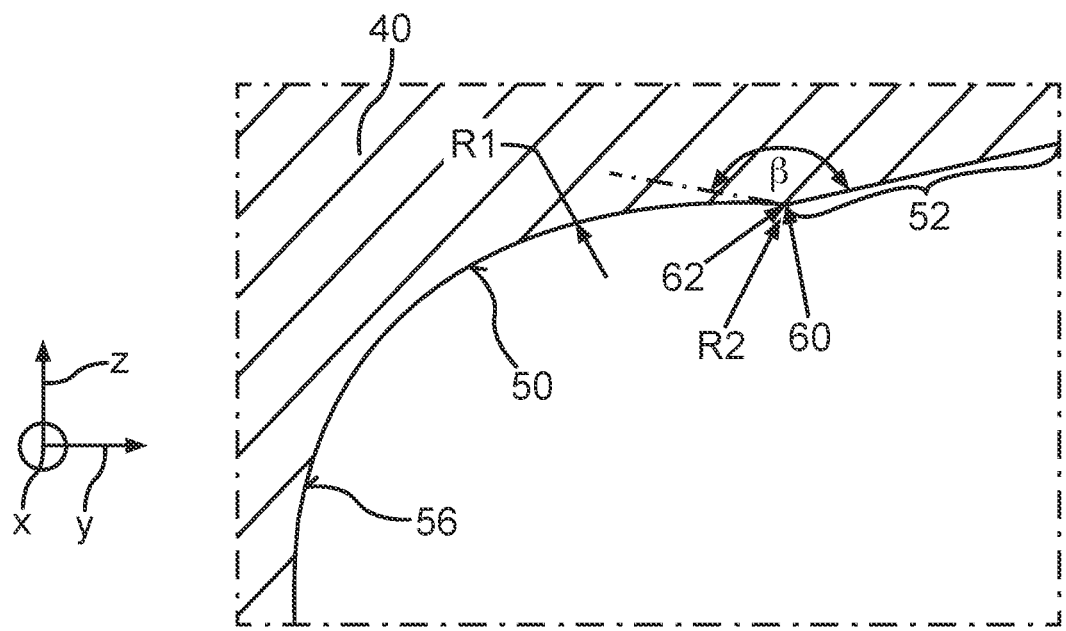
FIG. 3 shows a further enlarged detailed view of a variant of the rotor.

The first delimiting face 50 has an elevation 60, which narrows a gap 12 extending between the first delimiting face 50 and the second delimiting face 30 in regions thereof, as can be seen especially clearly in FIG. 2 and FIG. 3. As shown in the present instance, the elevation 60 can be formed, in particular, as a discontinuity. The elevation 60 is arranged at the uppermost depression 42 of the blade root 40, which, in the present instance, is in the vertical direction of extension z. The elevation 60 is thereby arranged on a so-called "dead rim." This "dead rim" may also be referred to as a "Totrand." The "dead rim" refers to an interlocking connection of the blade root 40 and the main rotor part 20 in the uppermost region in the vertical direction of extension z and may also be referred to as a blade root-rotor main part connection.

The blade root 40 can be formed symmetrically relative to a median plane 16 of the blade root 40, spanning the longitudinal direction of extension x and the vertical direction of extension z, which, in the present instance, for reasons of clarity, is not shown in more detail.

The elevation 60 borders directly on a first flat face portion 52 of the first delimiting face 50.

FIG. 2 shows, in an enlarged depiction of a region A surrounded by a frame in FIG. 1, that the elevation 60 can be arranged between the first flat face portion 52 and a second flat face portion 54 of the first delimiting face 50. The face portions 52, 54 can be inclined towards each other, as can be seen in FIG. 2.

In addition, the elevation 60 is arranged between a rounded face portion 56 of the first delimiting face 50 and the first flat face portion 52. The elevation 60 can be arranged, like the second flat face portion 54, in a transverse direction of extension y between the first flat face portion 52 and the rounded face portion 56, as can be seen in FIG. 2. The elevation 60, which, in the present instance, is formed as a sharp bend, serves to reduce any leakage through the gap 12, without any change in a radius R1— which, for reasons of clarity, is shown solely in FIG. 3—of the rounded face portion 56 owing to the reduction in the leakage and, in particular, without it becoming smaller or having to be compromised.

The second flat face portion 54 can enclose an angle α with a third face portion 32 that is assigned to the second delimiting face 30, as shown by way of example in FIG. 2, wherein the third flat face portion 32, together with the first flat face portion 52, delimits a second gap section 14b of the gap 12. The angle α can theoretically be at most of such size that the first flat face portion 52 is reduced to a value of "0." In the present instance, the first flat face portion 52 and the third flat face portion 32 are arranged one on top of the other in the vertical direction of extension z. The first flat face portion 52 and the third flat face portion 32 can preferably be oriented parallel to each other, as can be seen in FIG. 2. In an embodiment, during operation of the rotor, the gap 12 within the depression 42 comprises a first gap section 14a and a second gap section 14b, which border each other at the elevation 60. The first gap section 14a thereby extends, preferably starting from the elevation, with a gap width around an apex of the protrusion 24, wherein the gap width increases, initially monotonically, in particular strictly monotonically, up to a locally maximum gap width and then monotonically, in particular strictly monotonically, in particular down to zero.

The second flat face portion 54 can be oriented perpendicularly to the median plane 16 of the blade root 40 that extends parallel to the vertical direction of extension z of the blade root 40, as can be seen in FIG. 2. The second flat face portion 54 can thereby extend horizontally and, in the present instance, perpendicularly to a blade reference axis lying in the median plane 16.

FIG. 3 shows a variant of a design of the rotor 10 in the region A. In accordance with this variant, it can be provided that the first delimiting face 50 does not have the second flat face portion 54, so that the elevation 60, on the one hand, can adjoin directly the rounded face portion 56 and, on the other hand, can adjoin directly the first flat face portion 52. In accordance with said variant, therefore, the second flat face portion 54 can theoretically take on the value "0," so that the rounded face portion 56 with the radius R1 can enclose an obtuse angle β with the first flat face portion 52.

FIG. 3 shows, by way of example, an edge rounding 62 of the elevation 60. The edge rounding 62 is not further depicted in FIG. 1 and FIG. 2 for reasons of clarity. The edge rounding 62 can have a radius R2 that can be smaller than the radius R1. The elevation 60 with the adjoining first flat portion 52, depicted in FIG. 3 as a corner, can therefore generally be rounded with the radius R2.

As a result of the elevation 60, which is formed as a discontinuity, in particular as a sharp bend, it is possible to adjust a large radius value for the radius R1 in order to thereby ensure small notch stresses when the rotor 10 is used as intended. The elevation 60 serves for effective narrowing of the gap 12, so that the leakage passing through the gap 12 can be kept small in spite of the large radius value. The inclination of the first flat face portion 52 towards the third flat face portion 32, corresponding to the angle α, also enables the leakage to be reduced.

What is claimed is:

1. A rotor for a turbomachine, having at least one blade and having at least one rotor main part, which has at least one recess, in which a blade root of the least one blade is interlockingly received, wherein the blade root comprises at least one depression, in which at least one protrusion of the at least one rotor main part that delimits the at least one recess in regions thereof is received, wherein the at least one depression is delimited by a blade-root-side, first delimiting face and the at least one protrusion is delimited by a rotor-main-part-side, second delimiting face, wherein the first delimiting face has at least one elevation, which narrows a gap extending between the first delimiting face and the second delimiting face at least in regions thereof; the first delimiting face and the second delimiting face being in spaced apart relation to each other at the at least one elevation, wherein the at least one elevation is a single sharp bend discontinuity that directly borders a first flat face portion of the first delimiting face.

2. The rotor according to claim 1, wherein the elevation is formed within a non-bearing flank of the blade root directed towards a radially outward directed flank of the protrusion of the rotor main part.

3. The rotor according to claim 1, wherein the at least one elevation is arranged between the first flat face portion and a second flat face portion of the first delimiting face.

4. The rotor according to claim 1, wherein the at least one elevation is arranged between a rounded face portion of the first delimiting face and the first flat face portion.

5. The rotor according to claim 3, wherein the second flat face portion encloses an angle with a third flat face portion that is assigned to the second delimiting face, wherein the third flat face portion, together with the first flat face portion, delimits a gap section of the gap.

6. The rotor according claim 3, wherein the second flat face portion is oriented perpendicularly to a median plane of the blade root that extends parallel to a vertical direction of extension of the blade root.

7. The rotor according to claim 1, wherein the at least one elevation has an edge rounding.

8. The rotor according to claim 1, wherein, during operation of the rotor, the gap within the depression comprises a first and a second gap section, which border each other at the elevation, wherein the first gap section, starting from the elevation, extends with a gap width around an apex of the protrusion, which gap width increases initially monotonically up to a locally maximum gap width and then decreases monotonically down to 0, and/or the second gap section, starting from the elevation, extends, at least in a region bordering the elevation, with constant gap width.

9. The rotor according to claim 8, wherein the locally maximum gap width is arranged between the apex of the protrusion and the elevation.

10. The rotor according to claim 1, wherein the depression is a radially outermost depression of a blade root with a fir-tree profile.

11. A turbomachine with at least one rotor according to claim 1.

* * * * *